Feb. 14, 1956   R. H. CHERRY ET AL   2,734,376
COMPENSATED GAS-ANALYSIS BRIDGES
Filed Dec. 14, 1950   2 Sheets-Sheet 1
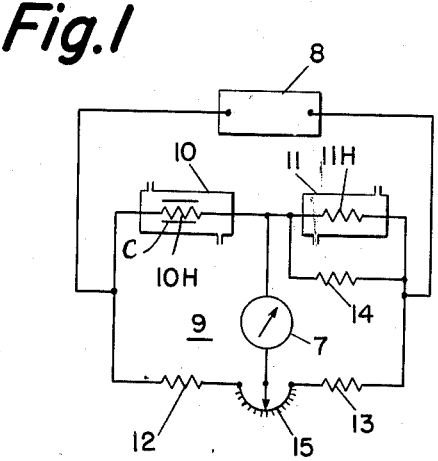
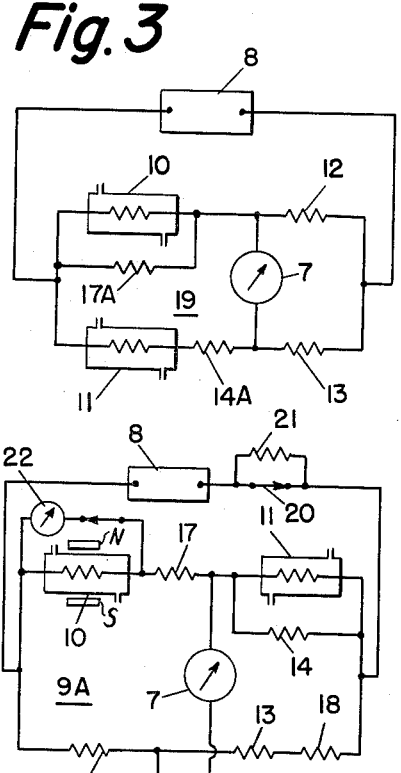
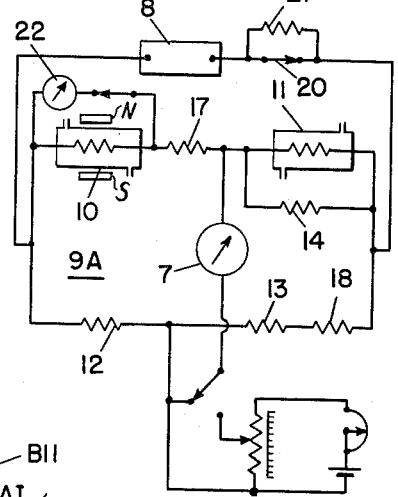
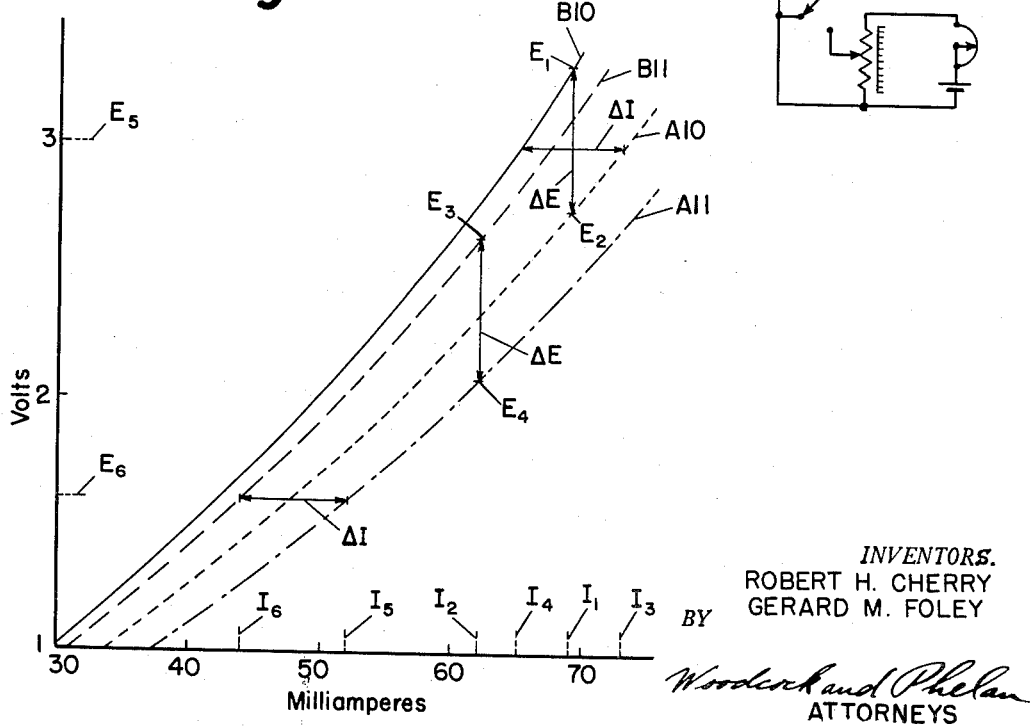
INVENTORS.
ROBERT H. CHERRY
GERARD M. FOLEY
BY
Woodcock and Phelan
ATTORNEYS

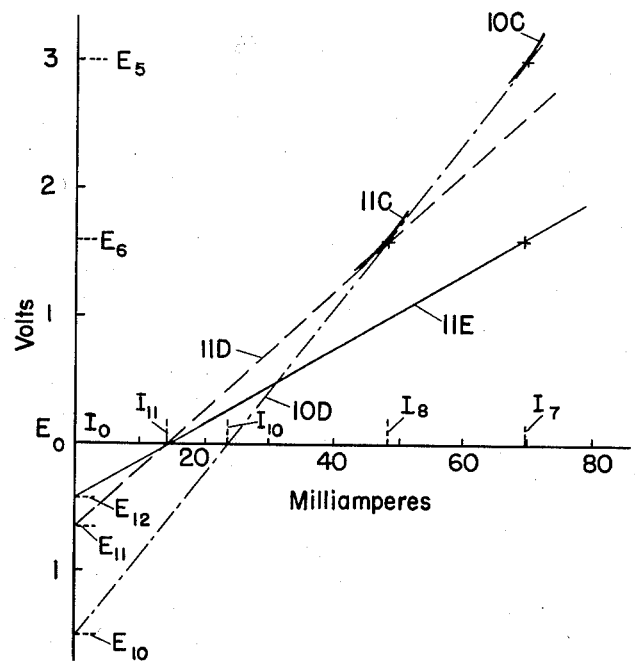
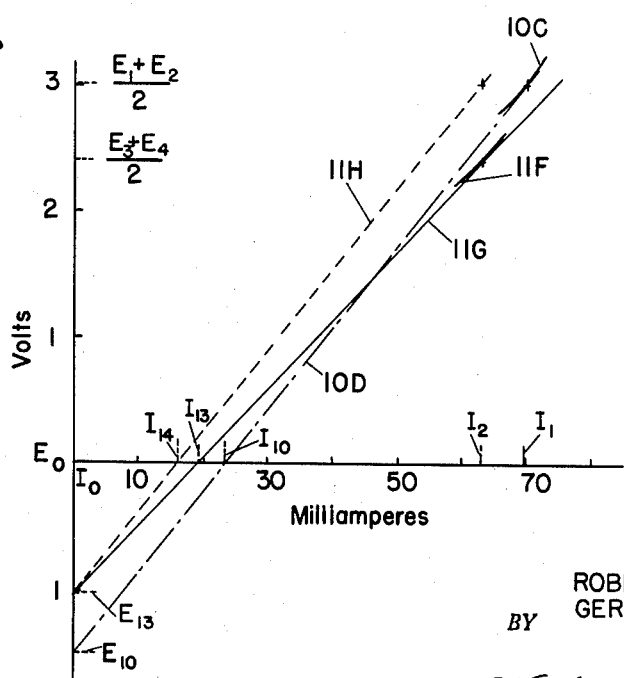

United States Patent Office 2,734,376
Patented Feb. 14, 1956

2,734,376

COMPENSATED GAS-ANALYSIS BRIDGES

Robert H. Cherry, Ambler, and Gerard M. Foley, North Hills, Pa., assignors to Leeds and Northrup Company, Philadelphia, Pa., a corporation of Pennsylvania Application December 14, 1950, Serial No. 200,828

18 Claims. (Cl. 73—27)

This invention relates to thermal gas-analysis bridges for measuring a selected component of a gaseous mixture and particularly relates to methods and arrangements for minimizing measurement errors due to variations in background composition of the gaseous mixture.

In gas-analysis bridges utilizing cells having heated resistors in thermal transfer relation to gas being analyzed, it is theoretically possible, by use of cells which have identical response characteristics except as to the selected gas component, to avoid errors due to variations in the background composition of the gas, but the precision required in manufacture and assembly of the cell components closely to approximate such theoretical ideal is prohibitively great and practically unattainable.

In accordance with the present invention, the difference between the background responses of a pair of cells in respective arms of a gas-analysis bridge is compensated by including in the same bridge arm as one of the cells a compensating resistor of such fixed value that the ratio of one factor of the volt/ampere characteristic of the bridge arm including that resistor to the same factor of that characteristic of the other cell arm, remains constant.

More particularly, and in one form of the invention, the cell resistors are in bridge arms which are in series in the same current branch, in which case the background compensating resistor is in shunt to one of the cell resistors, whereas in another form of the invention the cell resistors are in bridge arms which are in parallel current branches, in which case the background compensating resistor is in series with and in the same bridge arm as one of the cell resistors.

Further in accordance with the invention, the gas-analysis bridge may additionally be compensated for the difference in effects of variations of the bridge supply voltage upon the responses of the dissimilar cells by a compensating resistor of such value and circuit relation that the bridge balance is inappreciably affected by changes, concurrent or otherwise, in background composition of the gas and supply source voltage.

The invention further resides in compensating methods and arrangements hereinafter described and claimed.

For a more detailed understanding of the invention and for illustration of various embodiments thereof, reference is made to the accompanying drawings in which:

Fig. 1 schematically illustrates in simplified form a gas-analysis bridge including a shunt resistor for background compensation;

Fig. 2 is an explanatory figure showing dissimilar response curves of two gas-analysis cells;

Fig. 3 schematically illustrates another form of gas-analysis bridge using a series-resistor for background compensation;

Fig. 4 schematically illustrates a gas-analysis bridge compensated for variations in background composition, bridge supply voltage and ambient temperature; and Figs. 5 and 6 are explanatory figures referred to in discussion of supply-voltage compensation.

Referring to Fig. 1, the gas-analysis bridge 9 includes in adjacent arms the cells 10, 11 traversed by a gas mixture being analyzed and respectively containing resistors 10H, 11H in heat-transfer relation to the gas and heated by current from source 8. Each of the cell resistors may be a glass-covered conductor, such as platinum, having a substantial temperature coefficient of resistance so that the voltage drop across the cell is a function of the heating current traversing it and of transfer of heat to or from the gas within the cell. The other two arms of bridge 9 respectively include the resistors 12, 13 having negligible temperature coefficients of resistance.

One of the pair of cells (i. e., the analytical cell) is of type which responds to a selected component of the gas mixture so that assuming the bridge to be initially balanced, a change in concentration of the selected component will produce a corresponding unbalance of the bridge which may be detected or measured as by galvanometer 7 or equivalent device or network. For example, for measurement of oxygen concentration in the mixture, the analytical cell may be of the thermomagnetic type disclosed in our copending application Serial No. 84,614, upon which has issued Letters Patent 2,603,964, so that its voltage drop varies in dependence upon the amount of oxygen in the gas whereas the other cell is thermo-magnetically insensitive to oxygen: for combustion analysis, the analytical cell may be of the type disclosed in copending application Serial No. 186,832 having a catalyst in proximity to or coating the cell resistor to promote combustion of the combustible component or components of the gas so that the voltage drop of that cell varies as a function of the amount of combustibles—whereas the other cell of the pair (i. e., the reference cell) is insensitive to combustibles.

Therefore assuming that bridge 9 is being used for combustion analysis and that cell 10 is to be the analytical cell, cell 10 is made sensitive to the combustible property or characteristic of one or more components of the gas mixture as by providing its resistor 10H with a catalytic coating C schematically indicated in Fig. 1. If, on the other hand, bridge 9 is to be used for oxygen concentration measurements with cell 10 as the analytical cell, cell 10 is made sensitive to the paramagnetic characteristic or property of oxygen in she gas mixture by provision of a magnet having pole-pieces, N, S (Fig. 4). In both cases, the means added to and cooperating with the analytical cell makes the resistor of that cell responsive to a characteristic of a selected component or components of the gas mixture.

With the bridge 9 as thus far described, it is theoretically possible to utilize cells which have identical responses to non-selected components of the gas, such as nitogen and carbon dioxide in a flue gas mixture, so that unbalance of the bridge corresponds solely with variation of the selected component, for example, oxygen to which only one of the cells is sensitized. In practice, however, the precision in manufacture and assembly of cell components required to produce cells having background sufficiently close for accurate measurement of small changes in concentration of the selected component of the gas mixture is prohibitively great. By the present invention there may be utilized cells having dissimilar response characteristics to variations in background composition and the difference between the response characteristics is compensated by a fixed resistor which in Fig. 1 is the resistor 14 in shunt to cell 11. Various methods of determining the proper resistance value of resistor 14 are herein described.

In explanation of one method, reference is made to Fig. 2 in which the curves A10 and A11 respectively represent the volt/ampere characteristics of a particular pair of cells 10, 11 when they are traversed by a test gas corresponding with one background composition and in which the curves B10 and B11 represent the different volt/ampere characteristics of the same cells when the test gas traversing them is of a different background composition. As shown by the curves, the cell 11 of this pair has greater sensitivity to change in background composition than cell 10 whose curves A10, B10 have lesser divergence between them than between curves A11, B11. In determining the proper value of resistor 14 from these dissimilar background response characteristics of the cells, there is first determined the current change $\Delta I$ of the less sensitive cell occurring for a given cell voltage $E_5$. For example, in Fig. 2, at a cell voltage $E_5$ of 3 volts, the current through cell 10 changes from $I_3=72.9$ milliamperes to $I_4=64.9$ milliamperes for the given change in composition of the test gas representative of a change in background composition of gas subsequently to be analyzed. In the example given, the change in cell current is 8 milliamperes (ma.) for the given change in test gas. The next step is to determine for what value of operating voltage of the more sensitive cell the current through that cell changes by the same amount $\Delta I$ for the same change in background gas composition. From the curves of Fig. 2, it appears that a current change of $\Delta I=8$ ma. occurs at an operating voltage of $E_6=1.6$ volts for cell 11: the corresponding currents for cell 11 are $I_5=51.9$ ma. and $I_6=43.9$ ma.

Cells having the dissimilar response characteristics of Fig. 2 when in the bridge circuit of Fig. 1 may be operated at the respective voltages for which they have identical current changes for a given change in background composition by connecting in shunt to the more sensitive cell a resistor 14 whose resistance is numerically equal to the voltage of the more sensitive cell divided by the difference between the cell currents for the same background gas composition. For the particular cells and operating voltages discussed, the value of the compensating resistor 14 is therefore 760 ohms. More generally stated in mathematical form, the value of the shunt compensating resistor as determined in the above manner from the response characteristics of a particular pair of cells is (1) $$R_{sh} = \frac{E_6}{I_3 - I_5} = \frac{E_6}{I_4 - I_6}$$

With the bridge 9 of Fig. 1 so compensated by shunt resistor 14, the balance of the bridge is not disturbed by changes in composition of the background component of the gas being analyzed despite the dissimilar responses of the cells to changes in background composition and the bridge unbalance is accurately representative of small changes in concentration of that component of the gas to which one of the cells is selectively responsive. The unbalance of the bridge 9 may be measured in any suitable manner as by a potentiometer calibrated in terms of the selected component of the gas; alternatively, the bridge 9 may be rebalanced, as by adjustment of a calibrated slidewire 15, and the change in concentration of the selected component measured from the settings of the calibrated rebalancing means.

In the network 9 of Fig. 1, the two cells 10, 11 are in series in the same current branch; in this case, as above described, the background compensating resistor 14 is in shunt to that cell which is the more sensitive to variations in background composition of the gas, irrespective of whether that cell be the reference cell or the analytical cell. In the type bridge shown in Fig. 3, the cells 10, 11 are in parallel current branches, in which case the resistor 14A for compensating for the dissimilarity of the cell sensitivities to variation in background composition is in series with and in the same bridge arm as the more sensitive of the cells, irrespective of whether that cell be the reference cell or the analytical cell. The proper value of the series compensating resistor 14A of Fig. 3 is not the same as the proper value of shunt-compensating resistor 14 of Fig. 1 but it may also be determined from the response curves of Fig. 2 as now described.

For simplicity, assuming that the cells 10 and 11 of Fig. 3 have the background response characteristics discussed in connection with Fig. 2, the proper value of the series-compensating resistor 14A may be determined by first determining the change $\Delta E$ of the voltage of the less sensitive cell which occurs at a given operating current $I_1$ when the cell is traversed by test gases corresponding with two different background compositions of gas to be analyzed. As shown in Fig. 2, the voltage change $\Delta E$ of cell 10 at current $I_1$ is 0.57 volt: the corresponding voltages are $E_1=3.33$ and $E_2=2.76$. There is next determined that current of the more sensitive cell at which there occurs the same voltage change $\Delta E$ for the same change in gas composition. In Fig. 2, this same voltage change occurs in cell 11 for a current of $I_2=62$ ma.; the corresponding voltages of cell 11 are $E_3=2.66$ and $E_4=2.09$ volts.

Cells 10 and 11 having the dissimilar response characteristics of Fig. 2 when in the bridge 19 of Fig. 3 may be operated at the currents $I_1$ and $I_2$ for which they have identical voltage changes for the given change in background composition by connecting in series with the more sensitive cell a resistor 14A whose resistance is equal to the difference between the voltages of the cells at the same background composition divided by the current through the more sensitive cell. In the specific example given, the proper resistance value of the series resistor 14A is therefore 10.8 ohms.

More generally stated in mathematical form, the proper value of the series-compensating resistor 14A may be determined from the response curves of the cells as above described in discussion of Fig. 2 by substitution in the formula (2) $$R_s = \frac{E_1 - E_3}{I_2} = \frac{E_2 - E_4}{I_2}$$

With bridge 19 of Fig. 3 so compensated by series resistor 14A, its balance is not disturbed by change in composition of the background or vehicle gas being analyzed despite dissimilar responses thereto of the cells, and any bridge unbalance is therefore accurately representative of small changes in concentration of that component of the gas to which one of the cells is selectively responsive. The concentration of the selected component may therefore be precisely measured, despite the different sensitivities of the cells to changes in background composition, by calibrated means responsive to unbalance of the bridge or adjustable to rebalance it.

The bridge 9A of Fig. 4, like that of Fig. 1, includes a shunt resistor 14 in one cell arm compensating for dissimilar sensitivities of the cells 10, 11 to changes in background composition and additionally includes resistors 17 and 18 for respectively compensating for variations in voltage of the supply source 8 and for changes in ambient temperature. By proper circuit relation and values of resistors 14, 17 and 18, unbalance of the bridge 9A is not affected by concurrent or individual changes in any of these three variables which otherwise affect the relation between the bridge unbalance and concentration of the selected component of the gas, which for purposes of further explanation will be assumed to be the oxygen component of flue gas. In such case, the test gases are nitrogen alone and mixed with carbon dioxide.

For such subsequent use of the analyzer bridge 9A, it may be compensated by performing the following steps. With the switch 20 closed, nitrogen gas is supplied to cells 10, 11 and resistor 12 and/or resistor 13 adjusted to balance the bridge. The nitrogen is then replaced by a mixture of 80 per cent nitrogen and 20 per cent carbon dioxide: the resulting bridge unbalance, due to different sensitivities of the cells to the change in the test gas, is noted. Then with nitrogen again supplied to the cells, the compensating resistor 14 is adjusted to a somewhat different value, and the bridge again rebalanced by readjustment of 12 and/or 13. The nitrogen is then again replaced by the nitrogen-carbon dioxide mixture and the resulting bridge unbalance noted. If the second unbalance is greater than the first, the adjustment of resistor 14 was in wrong sense; whereas if the second unbalance is the smaller, the value of resistor 14 is more nearly correct. In either event, the foregoing steps are repeated until the change from one test gas to the other produces no unbalance of the bridge. If this compensation cannot be effected with resistor 14 in shunt to one of the cells, it is shifted to connection in shunt with the other cell and the above procedure repeated. This method does not require plotting of the volt/ampere response characteristics of the cells as in Fig. 2 for determination of the proper value of the resistor 14; but, on the other hand, it does require a series of resistor adjustments until the same proper value is eventually attained.

After the proper value of resistor 14 has been determined by either of these methods, the value of resistor 17 is adjusted or selected so that the bridge 9A thereafter remains in balance for variations of the voltage applied from source 8 to the bridge. The change or fluctuations in voltage occurring in subsequent use of the bridge is simulated, during the compensating procedure now to be described, by opening switch 20 to cut in the rheostat or equivalent resistance 21. The resistance 21 is of value which effects a change of the order of 5% to 10% of the voltage applied to the bridge. If resistor 17 is so adjusted that the bridge remains balanced when switch 20 is re-closed, a recheck of the background gas compensation for change from nitrogen to nitrogen and carbon dioxide mixture will, in practically all cases, show that the bridge is unsatisfactorily compensated for background gas variations and efforts to adjust resistors 14 and 17 to fixed values which accomplish simultaneous compensation for both variations in supply voltage and in background composition will not be successful.

To effect simultaneous compensation for both of these variations, the value of resistor 14 is first determined as above described and the voltage of the unshunted cell is then noted as measured by a high-impedance voltmeter 22. Thereafter, in the compensating procedure, whenever any change is made in the value or setting of resistor 17, the effective output voltage of source 8 is adjusted by a rheostat, Variac or the like so that the reading of voltmeter 22 is the same as existed for satisfactory background gas compensation. After the supply voltage is so readjusted, switch 20 is opened and closed to check the supply voltage compensation. When resistor 17 has been adjusted or selected by this procedure to a value for which opening of switch 20 does not affect the bridge balance, a recheck of the gas compensation will show it still to be satisfactory.

It is also possible to determine the proper value of fixed resistor 17 for addition to the background compensated bridge of Fig. 1 by measurement of the resistances $R_{10}$, $R_{11}$ of cells 10, 11 at the normal voltage applied to the bridge and by measurment of the resistances $R_{10}'$, $R_{11}'$ of the cells after the bridge voltage has been increased or decreased by say five or ten per cent. The resistance $R_{17}$ of the supply voltage compensating resistor 17 is calculated from $$(3) \qquad R_{17} = \frac{R_{10} R_{11}' - R_{10}' R_{11}}{R_{11} - R_{11}'}$$

The value of resistor 17 for compensating voltage supply variations without disturbing the background gas compensation may also be determined from the volt/ampere characteristics of the cell arms in the regions including their operating points. In Fig. 5, the curves 10C and 11C are the volt/ampere characteristics of the cells 10 and 11 in the vicinity of their operating points $E_5$, $I_7$ and $E_6$, $I_8$ respectively. The line 10D is tangent to curve 10C at the operating point and intersects the zero voltage axis at $I_{10}$ and the zero current axis at $E_{10}$. The slope of the line 10D is representative of the dynamic resistance of the cell arm which includes cell 10, i. e., the dynamic resistance of that arm is numerically equal to $$\frac{E_{10}}{I_{10}}$$

The line 11D is tangent to curve 11C at the operating point of cell 11 and intersects the zero voltage axis at $I_{11}$ and the zero current axis at $E_{11}$. The slope of the line 11D is determinative of the dynamic resistance of cell 11, i. e., the dynamic resistance of the cell of the shunted arm is numerically equal to $$\frac{E_{11}}{I_{11}}$$

Since, however, the cell 11 is shunted by background compensating resistor 14, the dynamic resistance of the cell arm including it is of different value. The line 11E through the intercept $E_0$, $I_{11}$ and the operating point $E_6$, $I_7$ of the shunted arm intersects the zero current axis at point $E_{12}$, $I_0$. The slope of line EEE is determinative of the dynamic resistance of the shunted arm 11, 14; i. e., the dynamic resistance of the shunted arm is numerically equal to $$\frac{E_{12}}{I_{11}}$$

The proper value of the supply-voltage compensating resistor 17 is equal to $$(4) \qquad R_{17} = R_D \left( \frac{I'}{I''} - 1 \right)$$

where $R_D$ is the dynamic resistance of that arm which has the greater of the zero-voltage current intercepts $I'$ and $I''$.

In the particular case under discussion, $I' = I_{10} = 23$ ma., the greater of the intercepts, $I'' = I_{11} = 14$ ma. and $R_D$, the dynamic resistance of the bridge arm having the greater intercept, is $$\frac{E_{10}}{I_{10}} = \frac{1.5}{23} = 65.2 \Omega$$

Therefore by substitution in Equation 4, the value of resistor 17 is 41.7 ohms and should be in the arm having the greater zero-voltage current intercept $I'$, which in the particular case of Fig. 4 is in the arm including cell 10.

In a generally similar manner, it can be shown that the proper value of a voltage-supply compensating resistor for the bridge 19 of Fig. 3 having the cells in parallel branches can be derived from the volt/ampere characteristics of the cell arms. That value is determined by solving the equation $$(5) \qquad G_{17} = G_D \left( \frac{E'}{E''} - 1 \right)$$

where:

$G_{17}$ is the conductance of the supply-compensating resistor;

$G_D$ is the dynamic conductance of the bridge arm having the greater zero-current voltage intercept $E'$; and $E''$ is the zero-current voltage intercept of the other cell arm.

In the particular case of Fig. 6, $E' = E_{10} = 1.5$ volts, $E'' = E_{13} = 1.03$ volts, and $$G_D = \frac{I_{10}}{E_{10}} = .0153 \text{ mhos}$$

Therefore by substitution in Equation 5, the proper resistance of resistor 17A is found to be 143 ohms and should shunt the arm having the greater zero-current voltage intercept $E'$ which in the particular case of Fig. 3 is the arm including cell 10.

The above values are ascertainable for a particular pair of cells 10, 11 from Fig. 6, in which the curves 10C and 11F are the volt/ampere characteristics of the cells 10 and 11 in the vicinity of the operating points $$\frac{E_1+E_2}{2}, I_1$$

and $$\frac{E_3+E_4}{2}, I_2$$

respectively, using the same designation as in Fig. 2. The slope of line 10D as in Fig. 5 is determinative of the dynamic resistance of the arm including cell 10. Line 11G is tangent to curve 11F at the operating point of cell 11 and intersects the zero current voltage axis at $E_{13}$: the slope of line 11G is determinative of the dynamic resistance of cell 11 at this operating point. Since, however, cell 11 is, in Fig. 3, in series with background compensating resistor 14A, the dynamic resistance of the arm including it is of different value. The line 11H through the intercept $E_{13}$, $I_0$ and the operating point $$\frac{E_1+E_2}{2}, I_2$$

of the arm intersects the zero voltage current axis at the point $E_0$, $I_{14}$. The slope of line 11H represents the dynamic resistance of arm 11, 14A: the dynamic resistance of that arm is numerically equal to $$\frac{E_{13}}{I_{14}}$$

which is the reciprocal of the dynamic conductance $G_{17}$ of Equation 5.

Although the compensating procedure for bridge 9A, Fig. 4, has been specifically discussed in preparation for analysis of a magnetically differentiated gas, it is also applicable to analyses wherein a combustible mixture is supplied to one cell and the products of its combustion supplied to the other cell. In such case, the adjustment of resistor 14 or determination of its proper value from response curves such as shown in Fig. 2 is made for two gas mixtures of different composition, both lacking the combustible component for which the analyzer is to be used after compensation. For example, if the analyzer is intended to analyze for oxygen, hydrogen may be mixed with the unknown gas sample before it is passed into the first gas-analysis cell; to compensate for variations in the background composition, mixtures of nitrogen plus carbon dioxide and substantially pure nitrogen may be used as the test gases in the manner above described for compensation of a thermomagnetic analyzer. If the bridge is intended to analyze for combustible components in flue gas, the unknown sample may be mixed with air; in compensation of the bridge for such use, resistor 14 is adjusted or its value determined for null output of the bridge when air is substituted as a test gas in replacement of a mixture of nitrogen and 20 per cent of carbon dioxide. The method may also be applied for compensating a bridge of the type in which combustion occurs in one of the cells but not in the other. Still another application of the invention is in thermal conductivity gas analysis of a ternary or more complex gas mixture in which the constituent to be determined may be removed from the mixture or caused to react with another constituent of the mixture after the original gas sample has traversed one cell and before it enters the second cell; in this case, the two gas mixtures used as test gases in preliminary compensation of the bridge as above described should correspond to the limits of thermal conductivity represented by variations in composition of the residual gas mixture after removal or reaction of the component to be determined.

Although there have been specifically disclosed and described gas-analysis bridges involving only two gas-analysis cells, the invention is applicable to bridges in which each bridge arm contains a gas-analysis cell and also to arrangements in which the unbalance of one bridge including gas cells is balanced against the unbalance of a second bridge including gas cells, all as disclosed in our copending applications, Serial Nos. 84,614, now Patent No. 2,603,964, and 186,832.

What is claimed is:

1. A gas-analysis bridge including a reference cell and an analytical cell traversed by the gas mixture to be analyzed and having temperature-sensitive resistors respectively in adjacent bridge arms and heated from a common source of current, said cells and their resistors being similar within practical tolerances of manufacture and assembly, sensitizing means cooperative with said analytical cell to render said analytical cell resistor responsive to a characteristic of a selected component of said gas mixture, and means for insuring accurate measurement of small changes in concentration of said selected component despite the difference within said tolerances of manufacture and assembly between the sensitivities of said similar reference and analytical cells to background characteristics of the gas mixture comprising a compensating resistor in circuit with and in the same bridge arm as one of said cells and having such value of resistance that the ratio of one factor of the volt/ampere characteristic of the arm including said compensating resistor to the same factor of the same characteristic of said adjacent arm remains constant for varying background composition of the gas mixture traversing both cells, the variation in ratio of the other factor of said characteristics then being representative solely of the variation of said selected component of the gas mixture.

2. An arrangement as in claim 1 in which the cell resistors are in adjacent bridge arms which are serially connected in a common current path and in which the compensating resistor is in shunt to that cell resistor which is the more sensitive to variation in background composition of the gas mixture and is of value equal to the difference of the currents of the cells at points of their volt/ampere characteristics at which they have the same current change for a given background change divided into the voltage of the more sensitive cell resistor.

3. An arrangement as in claim 1 in which the cell resistors are in adjacent bridge arms which are in parallel current paths and in which the compensating resistor is in series with that cell resistor which is the more sensitive to variations in background composition of the gas mixture and is numerically equal to the difference of the voltages of the cells at points of their volt/ampere characteristics at which they have the same voltage change for a given background change divided by the current of the more sensitive cell resistor.

4. An arrangement as in claim 1 in which one of said cell arms includes a resistor for compensating for variations of the bridge supply, one of said compensating resistors being in series in a cell arm and the other of said compensating resistors being in shunt in a cell arm.

5. An arrangement as in claim 1 in which tangents to the volt/ampere characteristic of the cell arms at their operating points have zero-voltage intercepts $E_0I'$, $E_0I''$ and zero-current intercepts $E'I_0$, $E''I_0$ determinative of the dynamic resistance of the arms and in which one of said cell arms additionally includes a resistor compensating for variations of the bridge supply, said resistor having a value defined by three of said intercepts, two of which define the dynamic resistance of the cell arm having a greater axial intercept, one of said two intercepts and the third intercept being determinative of the ratio of said value to said dynamic resistance.

6. An arrangement as in claim 2 in which one of said bridge arms additionally includes a resistor for compensating for supply source variations, said resistor having a fixed value R defined by $$R = R_D\left(\frac{I'}{I''}-1\right)$$

where $R_D$ is the dynamic resistance of the bridge arm having the greater zero-voltage current intercept $I'$ and $I''$ is the corresponding intercept for the other cell arm and being in series in the cell arm having the greater dynamic resistance.

7. An arrangement as in claim 3 in which one of said bridge arms includes a shunt resistor for compensating for supply-source variations, said resistor having a fixed conductance G defined by $$G = G_D \left(\frac{E'}{E''} - 1\right)$$

where $G_D$ is the dynamic conductance of the bridge arm having the greater zero-current voltage intercept $E'$ and $E''$ is the corresponding intercept for the other cell arm and being in shunt to the cell arm having the greater dynamic conductance.

8. An arrangement as in claim 2 in which the common current path also includes a series resistor which is in one of the serially-connected cell arms and which is of fixed value to maintain, over a substantial range of variation of the voltage of the bridge-supply source, substantial proportionality between the voltage drops of said arms.

9. An arrangement as in claim 3 in which one of the cell arms additionally includes a shunt resistor which is of fixed value to maintain, over a substantial range of variation of bridge-current supply, substantially proportionality between the currents through said cell arms.

10. An arrangement as in claim 1 in which one of the cell arms additionally includes a resistor of fixed value to maintain, over a substantial range of variation of the bridge supply, substantial proportionality of corresponding factors of the volt/ampere characteristics of the cell arms.

11. An arrangement as in claim 1 in which to insure any unbalance of the bridge is representative solely of the variation of the selected component of the gas mixture, one of the cell arms additionally includes a resistor of fixed value maintaining constant proportionality between the effect of the selected component and the bridge supply.

12. An arrangement as in claim 1 in which responsive means is connected to said cell arms and is connected to means adjustable to effect null response of said responsive means and to indicate the magnitude of the selected component of the gas mixture.

13. An arrangement as in claim 12 in which one of the cell arms additionally includes a resistance of fixed value to maintain, over a substantial range of variation of the bridge supply, a null response thereto of said responsive means.

14. A gas-analysis bridge including a reference cell and an analytical cell traversed by the gas mixture to be analyzed and having temperature-sensitive resistors respectively in adjacent bridge arms and heated from a common source of current, said cells and their resistors being similar within practical tolerances of manufacture and assembly, sensitizing means cooperating with said analytical cell to render said analytical cell resistor responsive to a characteristic of a selected component of said gas mixture, the resistors of said reference and analytical cells having responses to variations in other characteristics of said gas mixture and to variations of current from said common source which depart from equality because of variations within said tolerances of manufacture and assembly, and means for compensating for said departure from equality of the responses of the cells both to said variations in background composition of the gas and to said variations of current to the bridge so to insure accurate measurement of said selected component comprising two resistances of fixed values, one of which provides equality of one factor of the volt/ompere characteristics of the cell arms in their operating regions and the other of which provides substantial proportionality of the other factor of the volt/ampere characteristics of the cell arms in said operating regions.

15. An arrangement as in claim 14 in which the cells are in adjacent bridge arms which are serially connected in a common current path and in which one of the compensating resistors provides equality of the currents of the cell arms and the other of the compensating resistors provides substantial proportionality of the voltages across said cell arms.

16. An arrangement as in claim 14 in which the cells are in adjacent bridge arms which are in parallel current paths and in which one of the compensating resistors provides equality of the voltages of the cell arms and the other of the compensating resistors provides substantial proportionality of the currents through said cell arms.

17. An arrangement as in claim 1 in which the sensitizing means cooperative with the analytical cell is magnetic means for sensitization thereof to a paramagnetic component of the gas mixture.

18. An arrangement as in claim 14 in which the sensitizing means cooperative with the analytical cell is magnetic means for sensitization thereof to a paramagnetic component of the gas mixture.

References Cited in the file of this patent

UNITED STATES PATENTS

| 2,256,395 | Laub | Sept. 16, 1941 |
| 2,596,992 | Fleming | May 20, 1952 |

FOREIGN PATENTS

| 425,518 | Germany | Feb. 20, 1926 |
| 883,420 | France | July 5, 1943 |